US011556321B2

(12) United States Patent
Masters et al.

(10) Patent No.: US 11,556,321 B2
(45) Date of Patent: Jan. 17, 2023

(54) DEPLOYING MICROSERVICES ACROSS A SERVICE INFRASTRUCTURE

(71) Applicant: INTERNATIONAL BUSINESS MACHINES CORPORATION, Armonk, NY (US)

(72) Inventors: Oliver Paul Masters, Birmingham (GB); Alexander John Naylor, Newbury (GB); Samuel Christopher Smith, Eastleigh (GB); Andrew James Dunnings, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 16/562,827

(22) Filed: Sep. 6, 2019

(65) Prior Publication Data

US 2021/0072965 A1    Mar. 11, 2021

(51) Int. Cl.
*H04L 67/00* (2022.01)
*G06F 8/60* (2018.01)
(Continued)

(52) U.S. Cl.
CPC ............ *G06F 8/60* (2013.01); *G06F 9/44505* (2013.01); *G06F 11/3664* (2013.01); *H04L 67/34* (2013.01)

(58) Field of Classification Search
CPC ......... G06F 8/60; G06F 9/44505; H04L 67/34
See application file for complete search history.

(56) References Cited

U.S. PATENT DOCUMENTS

2016/0364666 A1* 12/2016 Johnson ........... G06Q 10/06312
2017/0199752 A1*  7/2017 Cao ..................... G06F 9/45558
(Continued)

FOREIGN PATENT DOCUMENTS

CN    101449242 A    6/2009
CN    106506605 A    3/2017
(Continued)

OTHER PUBLICATIONS

Dhall, "Performance Patterns in Microservices-Based Integrations", DZone Performance, Jun. 1, 2016 [accessed on Aug. 21, 2019], 5 pages, Retrieved from the Internet: <https://dzone.com/articles/performance-patterns-in-microservices-based-integr-1 >.
(Continued)

*Primary Examiner* — Michael A Keller
(74) *Attorney, Agent, or Firm* — Alexis N. Hatzis

(57) ABSTRACT

A method, computer system, and a computer program product for deploying a plurality of microservices across a service infrastructure having a plurality of resources is provided. The present invention may include determining at least one dependency of the plurality of microservices. The present invention may include for each resource of the plurality of resources, determining an outage distribution descriptive of an availability of the resource with respect to time. The present invention may include based on the outage distribution associated with each resource and the at least one dependency of the plurality of microservices, determining a deployment configuration of the plurality of microservices across the resources of the service infrastructure.

18 Claims, 7 Drawing Sheets

(51) Int. Cl.
*G06F 9/445* (2018.01)
*G06F 11/36* (2006.01)

(56) References Cited

U.S. PATENT DOCUMENTS

| | | | |
|---|---|---|---|
| 2017/0230349 A1 | 8/2017 | Gaur | |
| 2018/0026856 A1 | 1/2018 | Yang | |
| 2018/0039494 A1 | 2/2018 | Lander | |
| 2018/0039565 A1* | 2/2018 | Rajagopalan | G06F 11/3438 |
| 2018/0121221 A1 | 5/2018 | Ahuja | |
| 2018/0288094 A1 | 10/2018 | Ahuja | |
| 2018/0331905 A1 | 11/2018 | Toledo | |
| 2019/0057015 A1* | 2/2019 | Hassan | G06F 21/554 |
| 2019/0238620 A1 | 8/2019 | Narayanam | |

FOREIGN PATENT DOCUMENTS

| | | |
|---|---|---|
| CN | 109716729 A | 5/2019 |
| CN | 110069380 A | 7/2019 |
| CN | 114341810 A | 4/2022 |
| DE | 112020002987 T5 | 4/2022 |
| WO | 2007146368 A2 | 12/2007 |
| WO | 2017218029 A1 | 12/2017 |
| WO | 2021044296 A1 | 3/2021 |

OTHER PUBLICATIONS

Masters, et al., "Optimising Microservice Deployment for High Availability", Sep. 14, 2018, 2 pages.

Mell et al., "The NIST Definition of Cloud Computing", National Institute of Standards and Technology, Special Publication 800-145, Sep. 2011, 7 pages.

International Searching Authority, "Notification of Transmittal of the international Search Report and the Written Opinion of the International Searching Authority, or Declaration," Patent Cooperation Treaty, dated Nov. 27, 2020, 9 pages, International Application No. PCT/IB2020/058128.

Masters, et al., "Deploying Microservices Across a Service Infrastructure," Application and Drawings, Filed on Sep. 1, 2020, 34 Pages, Related Patent Application Serial No. PCT/IB2020/058128.

Masters, et al., "Deploying Microservices Across a Service Infrastructure," Application and Drawings, Filed on Sep. 1, 2020, 34 Pages, Related US Patent Application Serial No. 2022-513677.

Masters, et al., "Deploying Microservices Across a Service Infrastructure," Application and Drawings, Filed on Sep. 1, 2020, 34 Pages, Related US Patent Application Serial No. 2203977.0.

* cited by examiner

DEPLOYING MICROSERVICES ACROSS A SERVICE INFRASTRUCTURE

BACKGROUND

The present invention relates generally to microservices in a service infrastructure, and more particularly to a method for deploying a plurality of microservices across a service infrastructure having a plurality of resources.

The present invention also relates to a computer program product comprising computer-readable program code that enables a processor of a system, or a number of processors of a network, to implement such a method.

The present invention further relates to a computer system comprising at least one processor and such a computer program product, wherein the at least one processor is adapted to execute the computer-readable program code of said computer program product.

The present invention also relates to a system for deploying a plurality of microservices across a service infrastructure having a plurality of resources.

A traditional software service may be hosted in a cloud service over a traditional on-site deployment. Implementing a cloud service infrastructure may improve convenience of use, ease of setup, and may optimize flexibility and scalability of the infrastructure. It may be beneficial to ensure that a cloud service runs with optimal reliability in order to minimize the downtime of the service infrastructure. This may ensure that service level agreements, i.e., commitments agreed upon between a service provider and a service client, are met.

A microservice hosted in a cloud service may occasionally fail, resulting in the redeployment of the failed microservice. During the time required for redeployment, the failed microservice may experience a downtime, wherein the microservice is out of action and unavailable for use. The downtime may be dependent on the system architecture of the cloud service. Other microservices hosted in the cloud service may not be aware of the downtime of the failed microservice, and may attempt to continue interaction with the failed microservice. This can result in issues beyond just the failed microservice, e.g. lost transactions. Consequently, problems may arise when connecting a microservice to other failed microservices within the same bounded (internal) infrastructure or of a remote (external) infrastructure. Microservices and service infrastructures, both internal and external, may be slow or down. If the connected microservice is not designed to optimally handle this scenario, this may produce an adverse impact on the performance and stability of the overall service infrastructure (in this example, a cloud service).

The performance of a microservice in a system infrastructure relative to a predetermined performance threshold can be monitored. If the microservice is performing below expectations, i.e. the microservice performance is below the threshold, the location of the microservice may be investigated to determine the cause of the low performance. The microservice may be migrated to another location within the system infrastructure if the original location is found to be the cause of the low performance. This may enable the optimization of microservice performance in a system infrastructure; however, this approach may not optimize the reliability and availability of the microservice.

SUMMARY

The present invention seeks to provide a computer-implemented method for deploying a plurality of microservices across a service infrastructure having a plurality of resources.

The present invention further seeks to provide a computer program product including computer program code for implementing a proposed method when executed by a controller unit.

The present invention also seeks to provide a processing system adapted to execute this computer program code.

The present invention also seeks to provide a system for deploying a plurality of microservices across a service infrastructure having a plurality of resources.

According to an aspect of the present invention, there is provided a computer-implemented method. The method comprises determining dependencies of a plurality of microservices. For each resource of the service infrastructure, the method further comprises determining an outage distribution descriptive of an availability of the resource with respect to time. Based on the outage distribution associated with each resource and the dependencies of the plurality of microservices, the method then comprises determining a deployment configuration of the plurality of microservices across the resources of the service infrastructure.

According to yet another aspect of the invention, there is provided a data processing system. The system comprises an analysis component configured to determine the dependencies of the plurality of microservices. The system further comprises a processing component configured to, for each resource of the service infrastructure, determine an outage distribution descriptive of an availability of the resource with respect to time. The system further comprises a configuration component configured to determine a deployment configuration of the plurality of microservices across the resources of the service infrastructure based on the outage distribution associated with each resource and the dependencies of the plurality of microservices.

According to another aspect of the invention, there is provided a computer program product for deploying a plurality of microservices across a service infrastructure having a plurality of resources. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
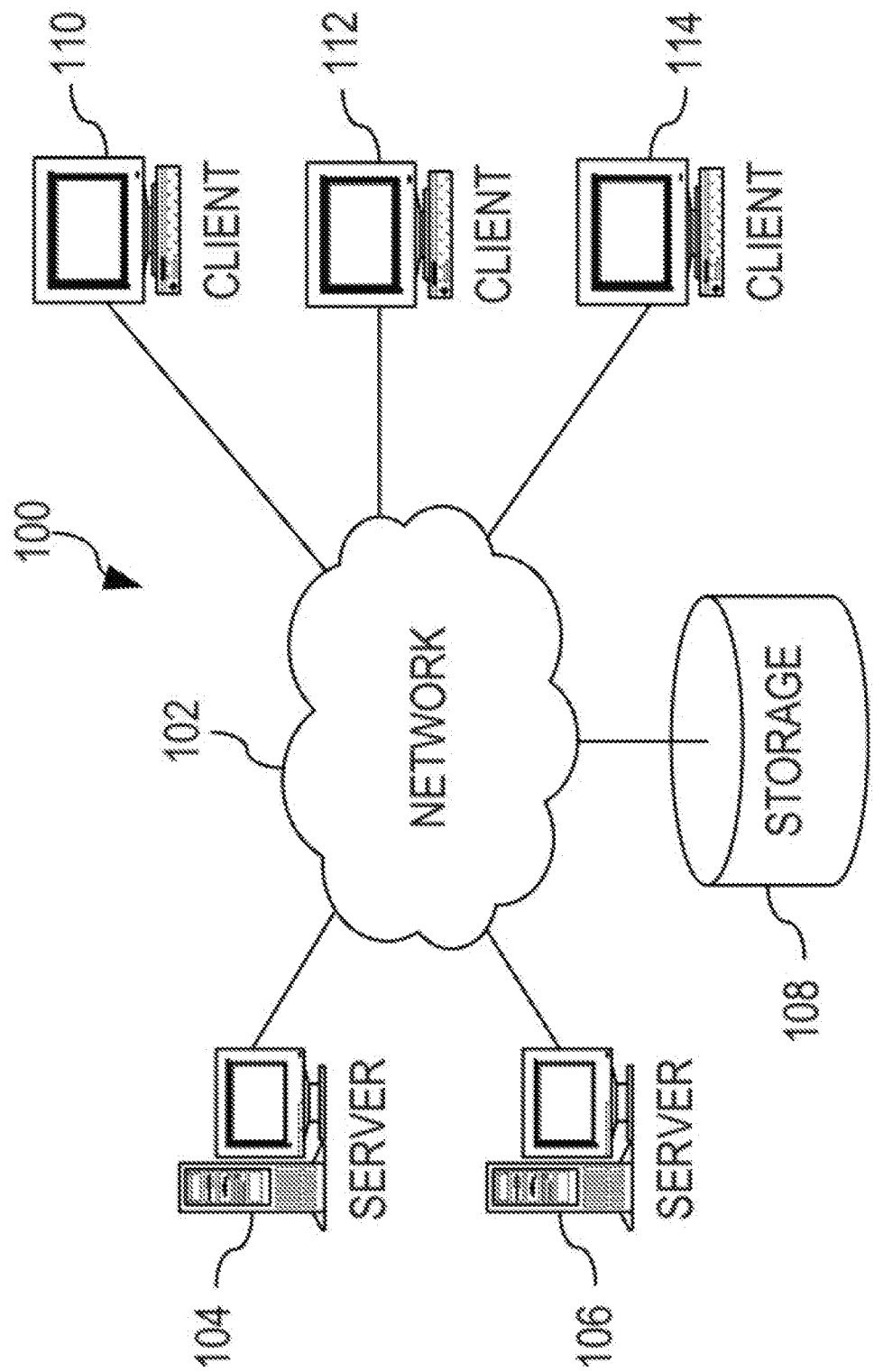
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. A system may also include thin clients, thick clients, hand-held or laptop devices, multiprocessor systems, microprocessor-based systems, network PCs, minicomputer systems, and distributed cloud computing environments that include any of the above systems or devices.

Concepts for deploying a plurality of microservices across a service infrastructure having a plurality of resources are proposed. Such concepts may enable the determination of an optimal deployment topology that is adapted to minimize the probability of a microservice-based service infrastructure incurring downtime. Accordingly, embodiments may facilitate deploying microservices across a service infrastructure.

Embodiments may be implemented in conjunction with statistical methods, continuous monitoring and/or sampling, and optimization algorithms for determining an optimal deployment configuration of the plurality of microservices.

Proposed embodiments may employ a concept of considering different possible outages that may affect the service infrastructure, and ensuring maximal tolerance to all such outages, weighting by estimates of the statistical distributions of the outages.

The inventors propose the provision of a configuration component. Such a configuration component may be configured to determine a deployment configuration of the plurality of microservices across the resources of the service infrastructure, based on an outage distribution associated with each resource and dependencies of the plurality of microservices. For example, the configuration component may be further configured to, for each resource of the service infrastructure, determine a probability of unavailability of the resource in a predetermined time period based on the outage distribution associated with the resource. Based on the probability of unavailability for each resource and the dependencies of the plurality of microservices, the configuration component may be configured to determine a deployment configuration of the plurality of microservices across the resources of the service infrastructure. The deployment configuration minimizes a probability of unavailability of the plurality of microservices.

Embodiments may thus facilitate the identification of a preferred deployment configuration of the plurality of microservices that reduces the probability of unavailability of the plurality of microservices. This may increase an overall availability of the service infrastructure without increasing the costs, e.g. by determining the optimal location(s) to deploy one or more microservices so that there is a minimal probability of a critical microservice going "down."

In a proposed embodiment, determining dependencies between the plurality of microservices may comprise identifying a plurality of different configurations of the plurality of microservices. Each configuration may comprise a respective set of microservice instances. For each configuration of the plurality of microservices, the step may further comprise determining a functionality of the respective set of microservice instances and, based on the determined functionality for each configuration, determining a dependency of at least one of the plurality of microservices. In this way, optimal or preferred configurations of the plurality of microservices may be determined. Based on such configurations, the dependencies of the plurality of microservices may be determined. Thus, the determined dependencies may be optimized, which may improve the efficiency of the service infrastructure.

In some embodiments, identifying a plurality of different configurations of the plurality of microservices may comprise receiving a user input for identifying a configuration of the plurality of microservices, then identifying a configuration of the plurality of microservices based on the user input. Thus, the configuration of the plurality of microservices may be adjusted based on user preferences. This may improve the ease of control and adaptability of identifying the configuration, which consequently may improve the ease of control and adaptability of the determined deployment configuration of the plurality of microservices across the resources of the service infrastructure.

In some embodiments, determining a functionality of a respective set of microservice instances may comprise simulating or testing execution of the set of microservice instances and determining a functionality of the set of microservices based on results of the simulation or testing. In this way, the respective set of microservice instances that result in a service infrastructure, which is considered "up," may be determined. This may enable the dependency of at least one of the plurality of microservices to be determined, which may optimize the process of determining a deployment configuration of the plurality of microservices across the resources of the service infrastructure.

In a proposed embodiment, determining an outage distribution for a resource may comprise analyzing a service level agreement associated with the resource and/or processing historical outage information relating to previous availability of the resource. In this way, the outage distribution may be directly taken from a service level agreement (SLA) of the provider of the service infrastructure. The provider may for example be the maintainer of the infrastructure and/or the manufacturer of the hardware implemented by the infrastructure. Thus, the distribution may be identified based on commitments held between the provider and a client of the service infrastructure, including aspects such as quality, availability and responsibilities of the service infrastructure. Further, the distributions may be inferred by long-term uptime metrics. This may improve the ease of control and adaptability of the process for determining the outage distribution, as well as increasing the reliability of the determined distribution.

In a proposed embodiment, determining a deployment configuration of the plurality of microservices across the resources of the service infrastructure may comprise, for each resource, determining a probability of unavailability of the resource in a predetermined time period based on the outage distribution associated with the resource. Based on the probability of unavailability for each resource and the dependencies of the plurality of microservices, the step may further comprise determining a deployment configuration of the plurality of microservices across the resources of the service infrastructure. The deployment configuration may minimize a probability of unavailability of the plurality of microservices. In this way, the probability of unavailability of each resource may be determined. This may enable the deployment configuration to be determined based on the probability of the unavailability of each resource, which consequently may optimize the process of determining the deployment configuration and may improve the efficiency of the method.

In some embodiments, determining a deployment configuration of the plurality of microservices across the resources of the service infrastructure may comprise employing a Monte-Carlo method to evaluate unavailability of the plurality of microservices for a plurality of different deployment configurations. In this way, the probability of the unavailability of the plurality of microservices for a plurality of different configurations may be evaluated as a cost function. The cost function may enable traditional optimization heuristics, e.g. simulated annealing, to be employed. The result of the optimization heuristic may be used to deploy the service infrastructure in a way such that the probability of any downtime being incurred may be minimized. It will, however, be understood that other methods to evaluate unavailability for different deployment configurations may be employed. For example, for simple availability zones' uptime distributions, statistical analysis may be used to calculate a closed form for the overall distribution instead.

In a proposed embodiment, the method may further comprise monitoring availability of the plurality of resources of the service infrastructure. The step may further comprise detecting a change in availability of a resource of the service infrastructure. Responsive to detecting a change in availability of a resource of the service infrastructure, the method may further comprise determining a modified deployment of the plurality of microservices across the resources of the service infrastructure. In this way, the service infrastructure may iteratively check for the optimal deployment configuration, enabling the determined deployment configuration to be updated regularly. This may optimize the efficiency of the method, and may ensure the deployment configuration is optimized at a current point in time.

In an example, a system may comprise two microservices with the same resource requirements. The two microservices may have many instances for high availability. The system may further include three resources, e.g. data centers that may be referred to as "availability zones". Traditionally, the approach taken to improving the availability of the system is to have one instance of each of the two microservices in each data center. Thus, in this traditional approach, six instances of microservices are required.

Considering the example further, the three data centers may be labeled as data center 1, data center 2, and data center 3. Data center 2 and data center 3 may have roughly equal reliability, and data center 1 may be more reliable than each of data center 2 and data center 3. Time may be discretized and in each time period any service infrastructure in data center n (where n=1, 2, or 3) may have a probability $s_n$ of being "down." If a service infrastructure is down, any microservice that was deployed to the down service infrastructure may also be down. Further, data center n may have a probability $d_n$ of being down at each data point, where, for each n:

$$d_n << s_n$$

A simplifying assumption may be made that, for all n:

$$\frac{d_n}{s_n} = a$$

wherein a may be a predetermined positive constant.

A further simplifying assumption may be made, where:

$$\frac{s_1}{s_2} = \frac{s_1}{s_3} = \frac{d_1}{d_2} = \frac{d_1}{d_3} = b$$

wherein b may be a predetermined positive constant between 0 and 1.

In this example, one microservice may be determined to be critical and the other microservice may be determined to be non-critical. Consequently, two instances of the critical microservice may be assigned to different service infrastructures in data center 1, one instance may be assigned to a service infrastructure in data center 2, and no instances may be assigned to data center 3. The non-critical microservice may have only one instance. In this way, the system may require fewer resources than the traditional approach described above which requires six instances of microservices to be deployed.

In the example, $s_1$=0.0001, i.e. each service infrastructure in data center 1 has a 99.99% chance of being up. Further, a=0.001, therefore data center 1 has a 99.99999% chance of being up. Further, b=0.01, therefore data center 2 and data center 3 have a 99.999% chance of being up respectively, and each service infrastructure in data center 2 and data center 3 has a 99% chance of being up. In this example, the inventive method results in an availability probability for the system of 99.99999898000101%, as opposed to the probability for the system of the traditional approach of 99.99999896990403%. Thus, the probability of availability is increased by a factor of 9.11, with only two out of the three resources being implemented.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
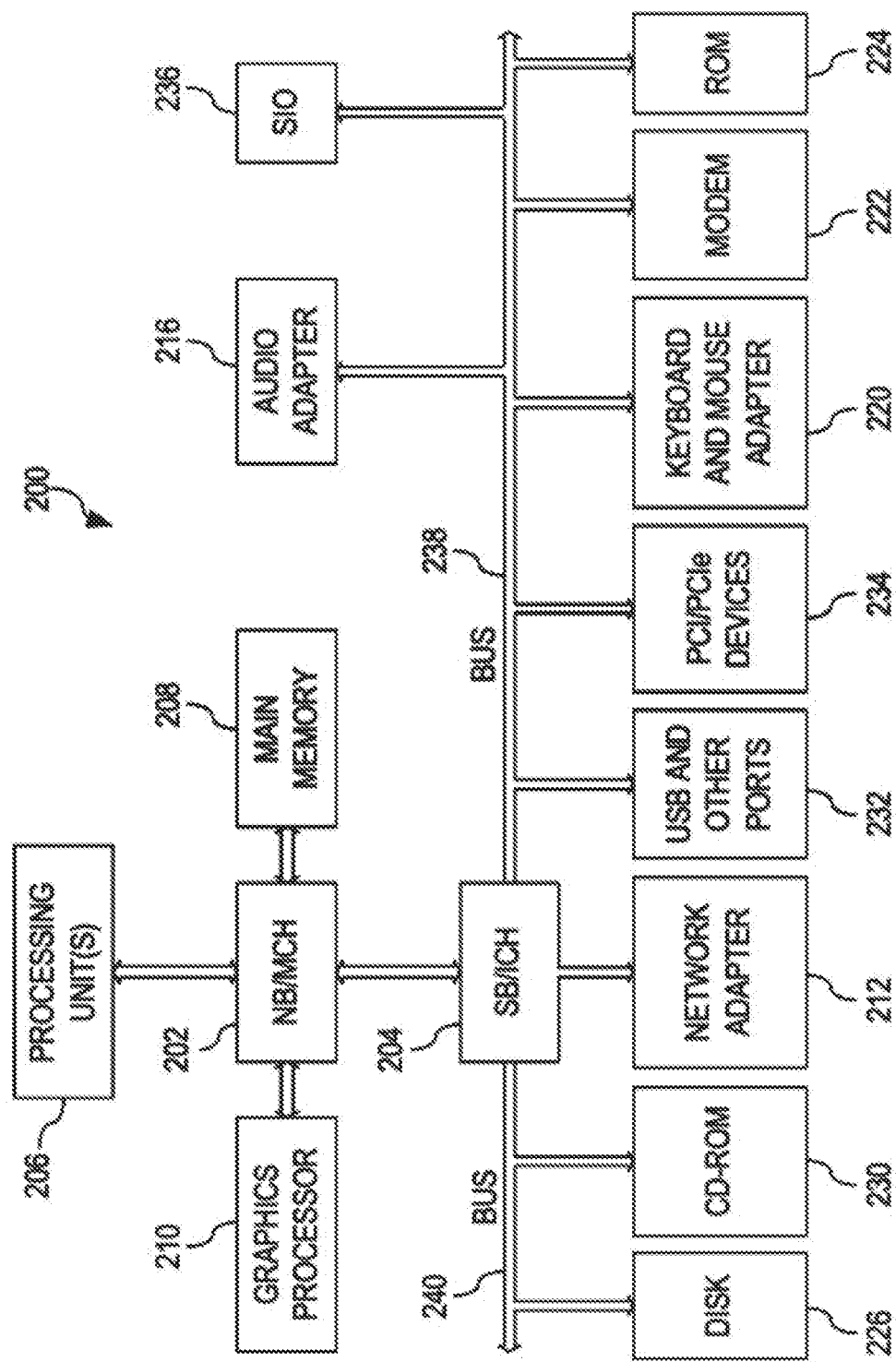
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
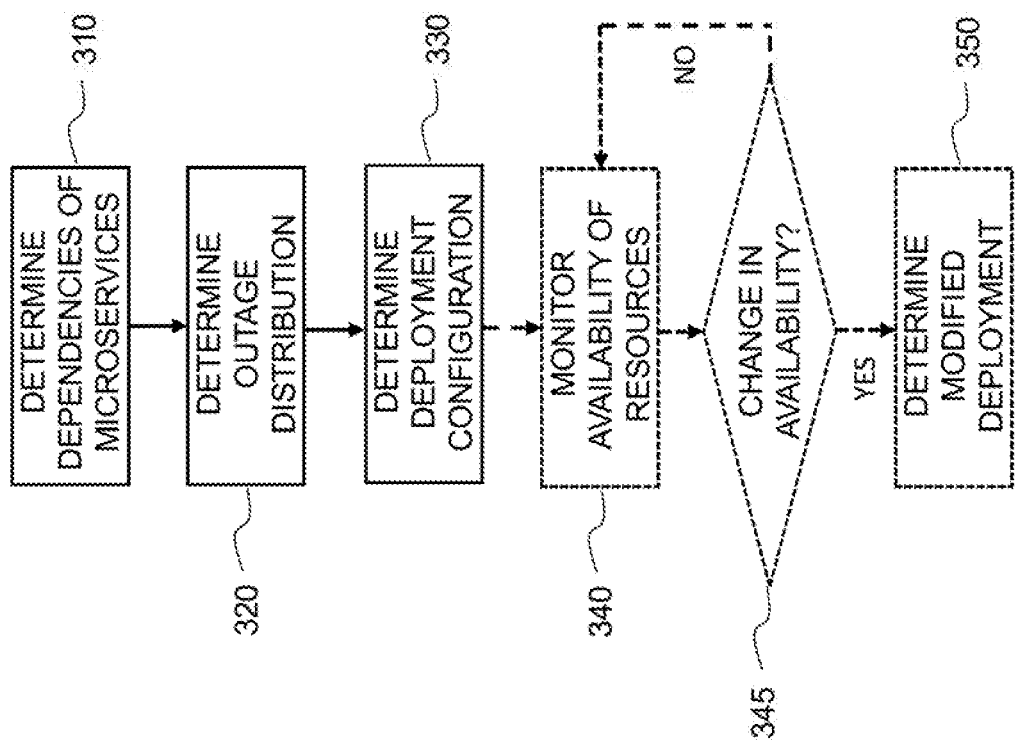
FIG. 3 is a flow diagram of a computer-implemented method for deploying a plurality of microservices across a service infrastructure having a plurality of resources.

Referring now to FIG. 3, there is depicted a flow diagram of a computer-implemented method for deploying a plurality of microservices across a service infrastructure having a plurality of resources.

Step 310 comprises determining dependencies of a plurality of microservices. In an embodiment, determining the dependencies of the plurality of microservices comprises identifying a plurality of different configurations of the plurality of microservices. Each configuration comprises a respective set of microservice instances. For each configuration of the plurality of microservices, the step further comprises determining a functionality of the respective set of microservice instances and, based on the determined functionality for each configuration, determining a dependency of at least one of the plurality of microservices.

For example, M is the plurality of microservices that comprises the service infrastructure. Examples of microservices include containers, virtual machines, or any other virtualized environment. The subsets of M, i.e. the configurations of the plurality of microservices, that result in a service infrastructure that is functioning as required, i.e. is considered "up," need to be determined. Several distinct elements of M, i.e. microservices, may be the same component which has multiple instances. The subsets of M that result in a service infrastructure that is performing as required can be formulated as needing to determine a function:

$$f: \wp(M) \rightarrow \{0,1\}$$

where:

$$f: S \mapsto 1$$

if and only if a service infrastructure where only microservices of S are "up" would be considered functioning.

In an embodiment, identifying a plurality of different configurations of the plurality of microservices comprises receiving a user input for identifying a configuration of the plurality of microservices, then identifying a configuration of the plurality of microservices based on the user input.

In the example, the method of determining f may comprise allowing the user, e.g. a product architect, to manually input possible acceptable sets. Not all elements of $\wp(M)$, i.e. subsets of M, need to be enumerated, since:

$$f(x)=1 \Rightarrow f(y)=1 \forall y$$

such that y is a superset of x, and:

$$f(x)=0 \Rightarrow f(y)=0 \forall y$$

such that y is a subset of x.

In an embodiment, determining a functionality of a respective set of microservice instances comprises simulating or testing execution of the set of microservice instances and determining a functionality of the set of microservices based on results of the simulation or testing.

In the example, the method of determining f may comprise ensuring that there is a relatively comprehensive system test suite, then using this suite to empirically determine which microservices are considered critical to the performance of the service infrastructure and which are not. This may be achieved by iterating through each container, switching each container off and rerunning the test suite, and using the results to determine whether to keep the microservice within a critical set, i.e. a set of microservices considered to be critical to the performance of the service infrastructure. This approach implicitly supposes that the partially ordered set:

$$(f^{-1}(1), \subseteq)$$

has a minimum element, i.e. microservice. When this assumption is not correct, stochastic methods may be employed instead to determine the location of each of the minimal elements.

Step 320 comprises, for each resource of the service infrastructure, determining an outage distribution descriptive of an availability of the resource with respect to time. In an embodiment, determining an outage distribution for a resource comprises analyzing a service level agreement associated with the resource and/or processing historical outage information relating to previous availability of the resource.

In the example, a hierarchy of the plurality of resources is generated. The hierarchy represents "availability zones" of various different levels. An outage distribution, i.e. a downtime distribution, is associated with each availability zone. The hierarchy of the plurality of resources may comprise each physical server, wherein each physical server has an outage distribution comprising 1% chance of being "down" for 3 hours (until physical replacement) and 0% chance of anything else. The hierarchy may further comprise a data center containing many servers, wherein each server has an outage distribution comprising 0.001% chance of being "down" for 5 hours, 0.01% chance of being "down" for 10 minutes, with a linear distribution between the two data points. The hierarchy may also comprise a power grid covering many data centres and/or a network spanning a plurality of data center, but not necessarily coinciding with the power grid boundaries.

In the example, the outage distributions may be directly taken from the service level agreement associated with the resource, e.g. maintainers of the service infrastructure and/or manufacturers of the hardware used. The outage distributions may also be inferred by long-term uptime metrics.

Step 330 comprises, based on the outage distribution associated with each resource and the dependencies of the plurality of microservices, determining a deployment configuration of the plurality of microservices across the resources of the service infrastructure.

In an embodiment, determining a deployment configuration of the plurality of microservices across the resources of the service infrastructure comprises, for each resource, determining a probability of unavailability of the resource in a predetermined time period based on the outage distribution associated with the resource. Based on the probability of unavailability for each resource and the dependencies of the plurality of microservices, the step further comprises determining a deployment configuration of the plurality of microservices across the resources of the service infrastructure. The deployment configuration minimizes a probability of unavailability of the plurality of microservices.

In an embodiment, determining a deployment configuration of the plurality of microservices across the resources of the service infrastructure comprises employing a Monte-Carlo method to evaluate unavailability of the plurality of microservices for a plurality of different deployment configurations.

In the example, based on the determined deployment configuration of the plurality of microservices across the resources of the service infrastructure, the probability of incurring downtime, i.e. unavailability of the plurality of microservices in the predetermined time period, is calculated. The unavailability is calculated using a Monte-Carlo method, enabling a probability to be determined, instead of a distribution. It is assumed that the service infrastructure is able to recover by re-provisioning new instances to replace failed, i.e. crashed, ones, but that a relatively small yet harmful amount of downtime occurs if anything from the critical set of microservices loses all of its instances.

Purely by way of example, downtime may be thirty seconds (comprising detection of the failure and starting up of a replacement service). However, this may depend significantly on the system involved, and so the downtime maybe much higher or much lower, in other examples.

In an embodiment, step 340 comprises monitoring availability of the plurality of resources of the service infrastructure. Step 345 comprises detecting a change in availability of a resource of the service infrastructure. Responsive to detecting a change in availability of a resource of the service infrastructure, step 350 comprises determining a modified deployment of the plurality of microservices across the resources of the service infrastructure.

Figure 4:
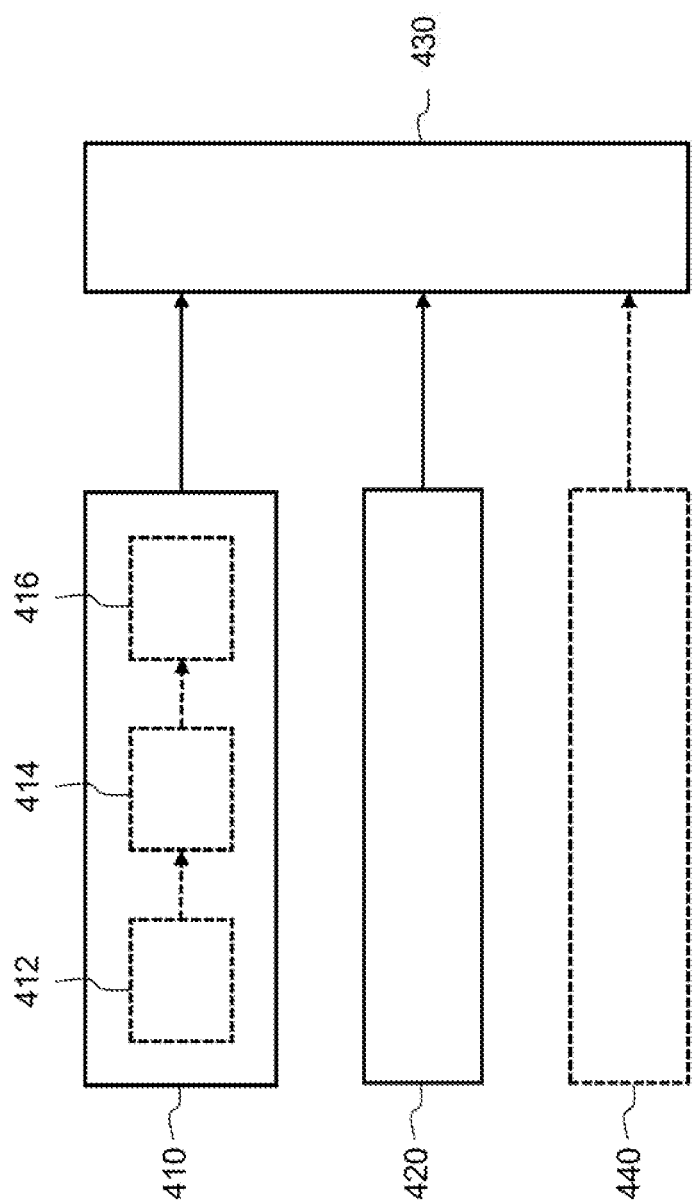
FIG. 4 is a simplified block diagram of an exemplary embodiment of a system for deploying a plurality of microservices across a service infrastructure having a plurality of resources.

Referring now to FIG. 4, there is depicted a simplified block diagram of an exemplary embodiment of a system for deploying a plurality of microservices across a service infrastructure having a plurality of resources.

The system comprises an analysis component 410 configured to determine the dependencies of the plurality of microservices. The system further comprises a processing component 420 configured to, for each resource of the service infrastructure, determine an outage distribution descriptive of an availability of the resource with respect to time. The system further comprises a configuration component 430 configured to determine a deployment configuration of the plurality of microservices across the resources of the service infrastructure based on the outage distribution associated with each resource and the dependencies of the plurality of microservices.

In an embodiment, the analysis component 410 comprises an identification component 412 configured to identify a plurality of different configurations of the plurality of microservices. Each configuration comprises a respective set of microservice instances. The analysis component 410 further comprises a functionality assessment component 414 configured to, for each configuration of the plurality of microservices, determine a functionality of the respective set of microservice instances. The analysis component 410 also comprises a data analysis component 416 for determining a dependency of at least one of the plurality of microservices based on the determined functionality for each configuration.

In an embodiment, the identification component 412 is further configured to receive a user input for identifying a configuration of the plurality of microservices and to identify a configuration of the plurality of microservices based on the user input.

In an embodiment, the functionality assessment component 414 is further configured to simulate or test execution of the set of microservice instances and to determine a functionality of the set of microservices based on results of the simulation or testing.

In an embodiment, the processing component 420 is further configured to analyse a service level agreement associated with the resource and process historical outage information relating to previous availability of the resource.

In an embodiment, the configuration component 430 is further configured to, for each resource, determine a probability of unavailability of the resource in a predetermined time period based on the outage distribution associated with the resource. Based on the probability of unavailability for each resource and the dependencies of the plurality of microservices, the configuration component 430 is further configured to determine a deployment configuration of the plurality of microservices across the resources of the service infrastructure. The deployment configuration minimizes a probability of unavailability of the plurality of microservices. The configuration component 430 is also configured to employ a Monte-Carlo method to evaluate unavailability of the plurality of microservices for a plurality of different deployment configurations.

In an embodiment, the system may further comprise a monitor component 440 configured to monitor availability of the plurality of resources of the service infrastructure to detect a change in availability of a resource of the service infrastructure. The configuration component 430 is further configured, responsive to detected change in availability of a resource of the service infrastructure, to determine a modified deployment of the plurality of microservices across the resources of the service infrastructure.

Figure 5:
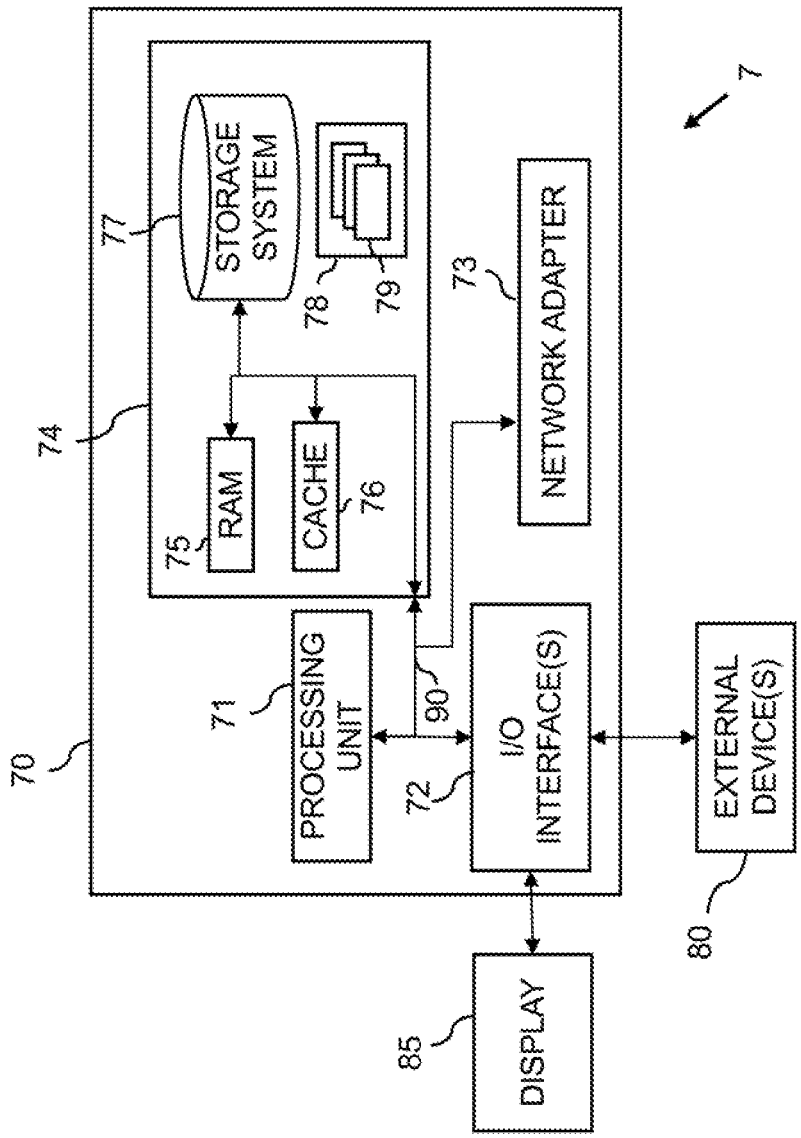
FIG. 5 is a simplified block diagram of an exemplary embodiment of a system for deploying a plurality of microservices across a service infrastructure having a plurality of resources.

By way of further example, as illustrated in FIG. 5, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

The processing unit 71 is configured to define a target object type; the target object type is adapted to hold results of a middleware function. Further, the processing unit 71 is configured to receive a first object for an application, then perform a process of the middleware function using the first object to generate a process result. Based on the process result, the processing unit 71 is configured to generate a second object of the target object type, and provide the second object to the application.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
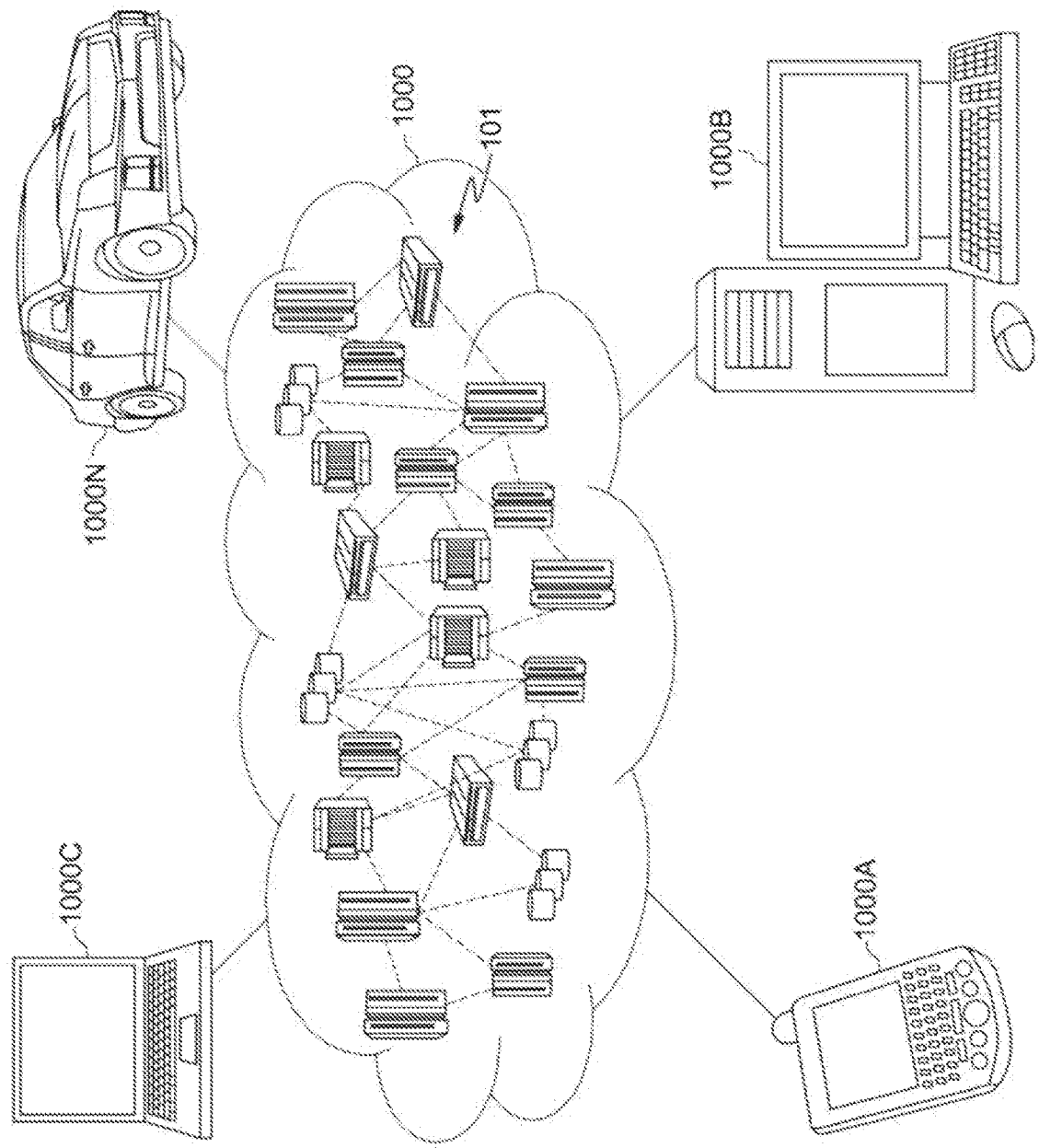
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 101 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 101 and cloud computing environment 1000 can communicate with any type of computerized device over any type of network and/or network addressable connection (e.g., using a web browser).

Figure 7:
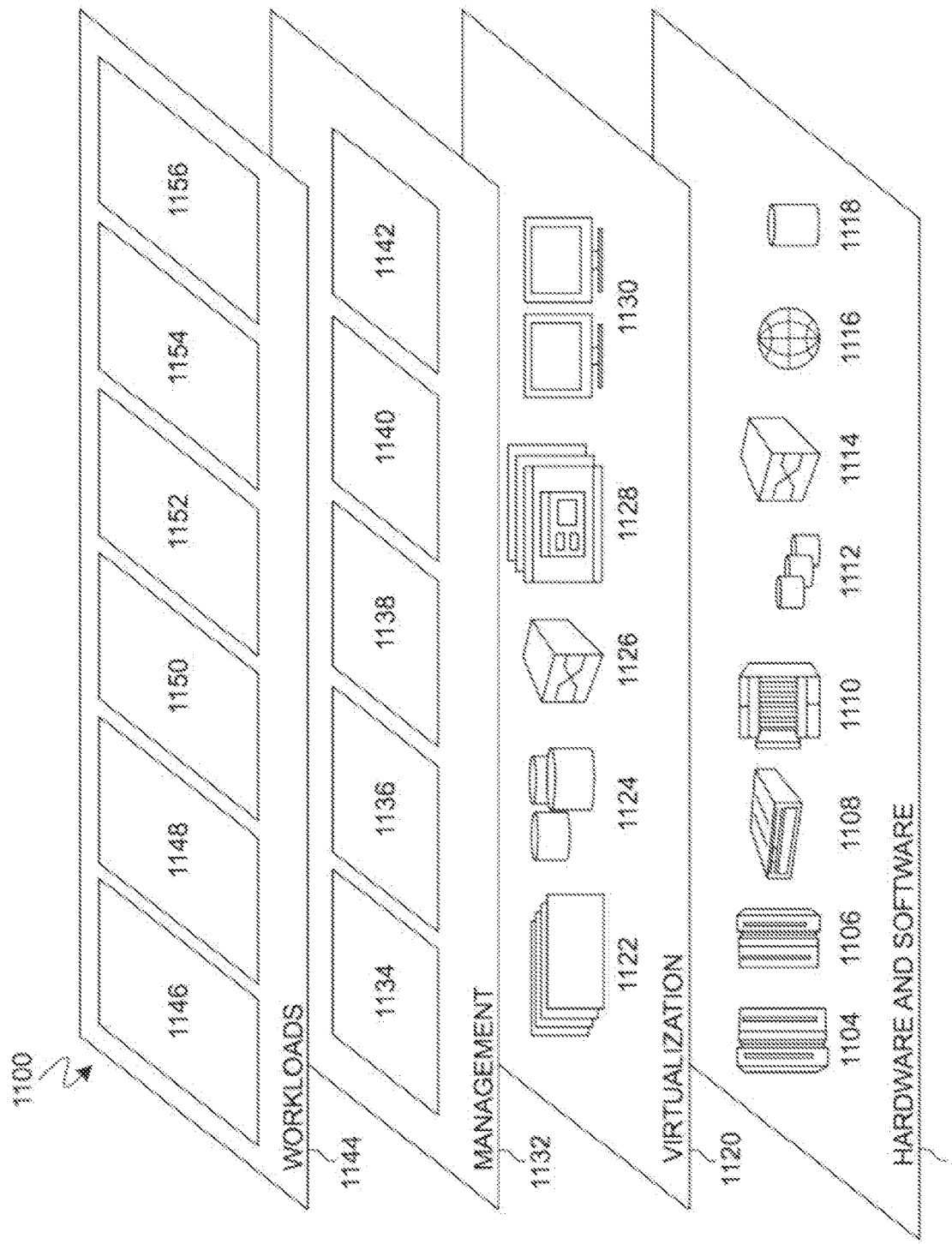
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deploying a plurality of microservices across a service infrastructure having a plurality of resources 1156.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deploying a plurality of microservices across a service infrastructure having a plurality of resources, the method comprising:
    determining at least one dependency of the plurality of microservices;
    for each resource of the plurality of resources, determining an outage distribution descriptive of an availability of the resource with respect to time;
    based on the outage distribution associated with each resource and the at least one dependency of the plurality of microservices, determining a deployment configuration of the plurality of microservices across the resources of the service infrastructure, which determination includes, for each resource of the service infrastructure, determining a probability of unavailability of each resource over a predetermined time period based on the outage distribution associated with the resource; and
    based on the probability of unavailability of each resource of the service infrastructure, and the at least one dependency of the plurality of microservices, determining the deployment configuration of the plurality of microservices across the resources of the service infrastructure, wherein the deployment configuration minimizes the probability of unavailability of the plurality of microservices.

2. The computer-implemented method of claim 1, wherein determining at least one dependency of the plurality of microservices comprises:
    identifying a plurality of different configurations of the plurality of microservices, wherein each of the plurality of different configurations comprises a respective set of microservice instances;
    for each of the plurality of different configurations of the plurality of microservices, determining a functionality of the respective set of microservice instances; and
    based on the determined functionality of the respective set of microservice instances for each of the plurality of different configurations, determining a dependency of at least one of the plurality of microservices.

3. The computer-implemented method of claim 2, wherein determining a functionality of the respective set of microservice instances comprises:
    simulating or testing execution of the respective set of microservice instances; and
    determining a functionality of the respective set of microservice instances based on results of the simulation or testing.

4. The computer-implemented method of claim 2, wherein identifying the plurality of different configurations of the plurality of microservices comprises:
    receiving a user input relative to identifying a configuration of each of the plurality of microservices; and identifying the configuration of each of the plurality of microservices based on the user input.

5. The computer-implemented method of claim 1, wherein determining the deployment configuration of the plurality of microservices across the resources of the service infrastructure comprises employing a Monte-Carlo method to evaluate unavailability of the plurality of microservices for a plurality of different deployment configurations.

6. The computer-implemented method of claim 1, further comprising:
monitoring an availability of the plurality of resources of the service infrastructure to detect a change in the availability of a resource of the service infrastructure; and
responsive to detecting a change in availability of the resource of the service infrastructure, determining a modified deployment of the plurality of microservices across the plurality of resources of the service infrastructure.

7. The computer-implemented method of claim 1, wherein determining the outage distribution comprises at least one of:
analyzing a service level agreement associated with each resource of the plurality of resources; and
processing a plurality historical outage information relating to a previous availability of the resource.

8. A computer system for deploying a plurality of microservices across a service infrastructure having a plurality of resources, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
determining at least one dependency of the plurality of microservices;
for each resource of the plurality of resources, determining an outage distribution descriptive of an availability of the resource with respect to time; and
based on the outage distribution associated with each resource and the at least one dependency of the plurality of microservices, determining a deployment configuration of the plurality of microservices across the resources of the service infrastructure, which determination includes, for each resource of the service infrastructure, determining a probability of unavailability of each resource over a predetermined time period based on the outage distribution associated with the resource; and
based on the probability of unavailability of each resource of the service infrastructure, and the at least one dependency of the plurality of microservices, determining the deployment configuration of the plurality of microservices across the resources of the service infrastructure, wherein the deployment configuration minimizes the probability of unavailability of the plurality of microservices.

9. The computer system of claim 8, wherein determining at least one dependency of the plurality of microservices comprises:
identifying a plurality of different configurations of the plurality of microservices, wherein each of the plurality of different configurations comprises a respective set of microservice instances;
for each of the plurality of different configurations of the plurality of microservices, determining a functionality of the respective set of microservice instances; and
based on the determined functionality of the respective set of microservice instances for each of the plurality of different configurations, determining a dependency of at least one of the plurality of microservices.

10. The computer system of claim 9, wherein determining a functionality of the respective set of microservice instances comprises:
simulating or testing execution of the respective set of microservice instances; and
determining a functionality of the respective set of microservice instances based on results of the simulation or testing.

11. The computer system of claim 9, wherein identifying the plurality of different configurations of the plurality of microservices comprises:
receiving a user input relative to identifying a configuration of each of the plurality of microservices; and
identifying the configuration of each of the plurality of microservices based on the user input.

12. The computer system of claim 7, wherein determining the deployment configuration of the plurality of microservices across the resources of the service infrastructure comprises employing a Monte-Carlo method to evaluate unavailability of the plurality of microservices for a plurality of different deployment configurations.

13. The computer system of claim 8, further comprising:
monitoring an availability of the plurality of resources of the service infrastructure to detect a change in the availability of a resource of the service infrastructure; and
responsive to detecting a change in availability of the resource of the service infrastructure, determining a modified deployment of the plurality of microservices across the plurality of resources of the service infrastructure.

14. The computer system of claim 8, wherein determining the outage distribution comprises at least one of:
analyzing a service level agreement associated with each resource of the plurality of resources; and
processing a plurality historical outage information relating to a previous availability of the resource.

15. A computer program product for deploying a plurality of microservices across a service infrastructure having a plurality of resources, comprising:
one or more non-transitory computer-readable storage media and program instructions stored on at least one of the one or more tangible storage media, the program instructions executable by a processor to cause the processor to perform a method comprising:
determining at least one dependency of the plurality of microservices;
for each resource of the plurality of resources, determining an outage distribution descriptive of an availability of the resource with respect to time; and
based on the outage distribution associated with each resource and the at least one dependency of the plurality of microservices, determining a deployment configuration of the plurality of microservices across the resources of the service infrastructure, which determination includes, for each resource of the service infrastructure, determining a probability of unavailability of each resource over a predetermined time period based on the outage distribution associated with the resource; and based on the probability of unavailability of each resource of the service infrastructure, and the at least one dependency of the plurality of microservices, determining the deployment configuration of the plurality of microservices across the resources of the service infrastructure, wherein the deployment configuration minimizes the probability of unavailability of the plurality of microservices.

16. The computer program product of claim 15, wherein determining at least one dependency of the plurality of microservices comprises:

identifying a plurality of different configurations of the plurality of microservices, wherein each of the plurality of different configurations comprises a respective set of microservice instances;

for each of the plurality of different configurations of the plurality of microservices, determining a functionality of the respective set of microservice instances; and based on the determined functionality of the respective set of microservice instances for each of the plurality of different configurations, determining a dependency of at least one of the plurality of microservices.

17. The computer program product of claim 16, wherein determining a functionality of the respective set of microservice instances comprises:

simulating or testing execution of the respective set of microservice instances; and determining a functionality of the respective set of microservice instances based on results of the simulation or testing.

18. The computer program product of claim 16, wherein identifying the plurality of different configurations of the plurality of microservices comprises:

receiving a user input relative to identifying a configuration of each of the plurality of microservices; and identifying the configuration of each of the plurality of microservices based on the user input.

* * * * *